United States Patent

[11] 3,599,189

[72] Inventors David R Hadden, Jr.
Eatontown;
Lorenz M. Sarlo, Matawan, both of, N.J.
[21] Appl No 866,182
[22] Filed Oct. 14, 1969
[45] Patented Aug. 10, 1971
[73] Assignee The United States of America as represented by the Secretary of the Army

[54] DISPLAY MEMORY
6 Claims, 3 Drawing Figs.

[52] U.S. Cl. .................. 340/174 YC, 340/174 BC, 340/174 CC, 340/174 PC, 340/174 TF, 340/174 M, 340/174 QA, 350/151, 350/162
[51] Int. Cl. .................. G11c 11/42, G11c 11/14, G11c 5/02
[50] Field of Search .................. 340/174; 350/162, 151

[56] References Cited

UNITED STATES PATENTS 3,347,617 10/1967 Fuller et al. .................. 350/162
3,508,215 4/1970 Cohler et al. .................. 340/174

OTHER REFERENCES

IBM Technical Disclosure Bulletin, " Flexible Magnetic Keeper For Thin-Film Memories," by Stapper, Jr., Vol 8, No 10, 3/66 Pgs. 1411 — 1412, copy in 340- 174 Keeper IBM Technical Disclosure Bulletin, " Magnetic Film Storage Configuration," by Bertin; Vol. 8; No. 3, 8/65 P 441; copy in 340- 174 Keeper.

*Primary Examiner*—Stanley M. Urynowicz, Jr.
*Attorneys*—Harry M. Saragovitz, Edward J. Kelly, Herbert Berl and Jeremiah G. Murray

ABSTRACT: A combination digital display and memory element comprising a thin film of magnetic material having a uniaxial anisotropy, a matrix of crossed conductors, and a thin film of rotatable anistropic magnetic material having a dense banded domain structure. A coloidal suspension of ferromagnetic particles covered with a transparent chamber is placed over the magnetic material. Light directed at the coloidal suspension will be reflected to produce an image of the domain structure contained in the magnetic films. The domains are selectively produced by generating currents on the crossed conductors.

PATENTED AUG 10 1971 3,599,189

INVENTORS
DAVID R. HADDEN Jr. &
LORENZ M. SARLO

BY Jeremiah G. Murray AGENT
Harry M. Saragovitz, Edward J. Kelly &
Herbert Berl ATTORNEYS

DISPLAY MEMORY

The invention described herein may be manufactured, used, and licensed by or for the Government for governmental purposes without the payment to us of any royalty thereon.

The present invention relates to electronic display devices and more particularly to a combination digital display and memory element.

In the field of automatic data processing, the digital computer has found wide use as a device for generating digital information which may be displayed to form pictures, graphs, diagrams, etc. Such information is normally available as to two level voltage at the output of the computer which is connected via appropriate drivers to the input of a cathode-ray tube (CRT) to modulate the electron beam as it scans the screen. The image will be formed from an array of light and dark spots on the CRT screen. Those concerned with the development of such display devices have long recognized the need of a combination display and memory device which is capable of storing the information to be displayed for an unlimited period and which requires relatively little power and circuitry to operate. The above mentioned CRT device consumes a substantial mount of power which is required for continuous scanning of the screen and sampling of the computer output for the entire time that the display is being presented. The present invention eliminates these requirements.

It is, therefore, the primary object of the present invention to provide a combination display and memory which is compact, simple, inexpensive, and efficient.

The exact nature of this invention as well as other objects and advantages thereof will be readily apparent from consideration of the following specification related to the annexed drawing in which.

Figure 1:
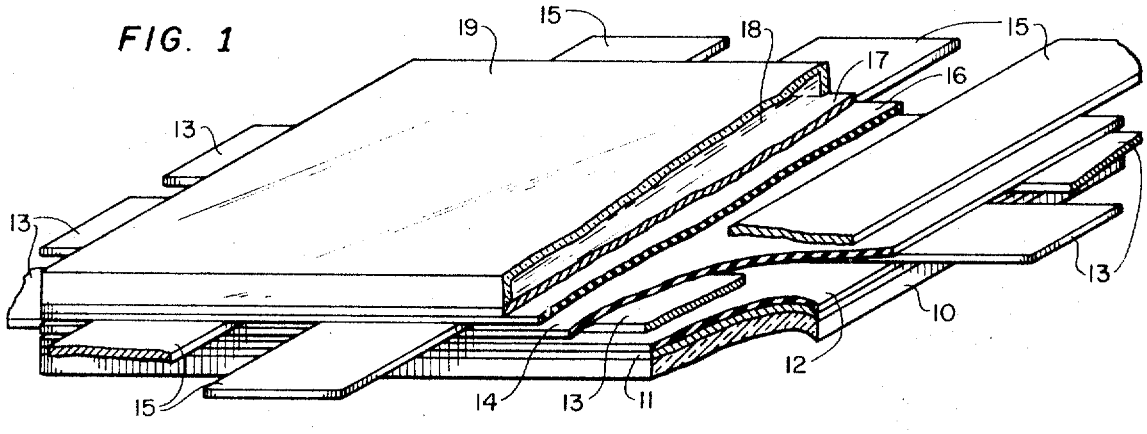
FIG. 1 is an isometric view with parts broken away of a preferred embodiment of the invention.

Referring now to the drawings there is shown in FIG. 1 a substrate 10 on which is deposited a thin film 11 of magnetic material having a uniaxial anisotropy the easy axis of which lies in the plane of the film 11. Such materials are well known, an example of which is permalloy (Ni-Fe). Deposited on magnetic film 11 is a thin film insulator 12. A plurality of elongated spaced parallel conductive films 13 covered by an insulating thin film 14 are deposited on film 12. A second set of elongated spaced parallel conductive films 15 are deposited on film 14 in a direction transverse to conductive films 13. An insulating film 16 covers conductors 15. A thin magnetic film 17 having a rotatable anisotropy and dense-banded domain structure is deposited on insulator film 16. Such materials are also well known ans a detailed discussion of such films may be found in "Applied Physics Letters," Volume 3, Number 11, Page 208, Dec. 1, 1963. A bitter-pattern coloidal suspension 18 of ferromagnetic particles 20 enclosed in a transparent envelope 19 covers film 17.

Figure 2:
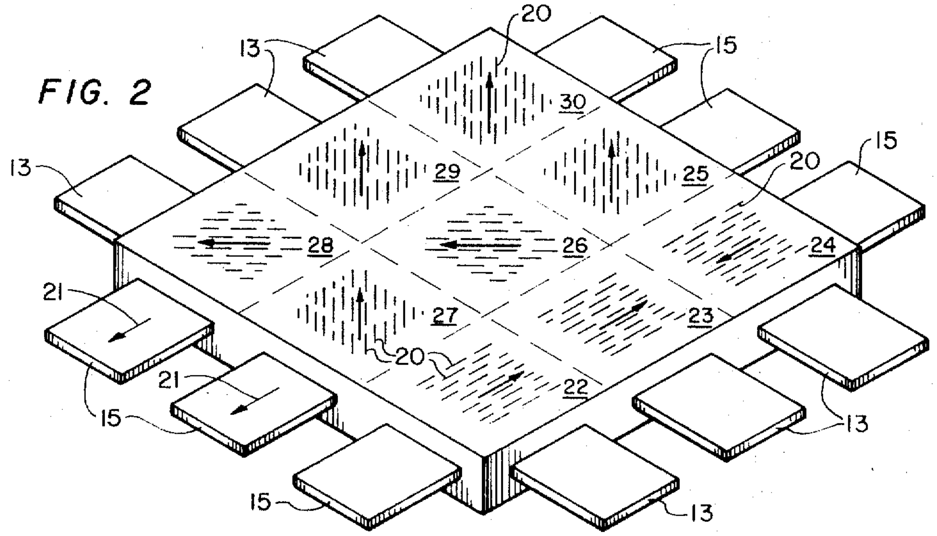
FIG. 2 is an isometric view of the device of FIG. 1.
Figure 3:
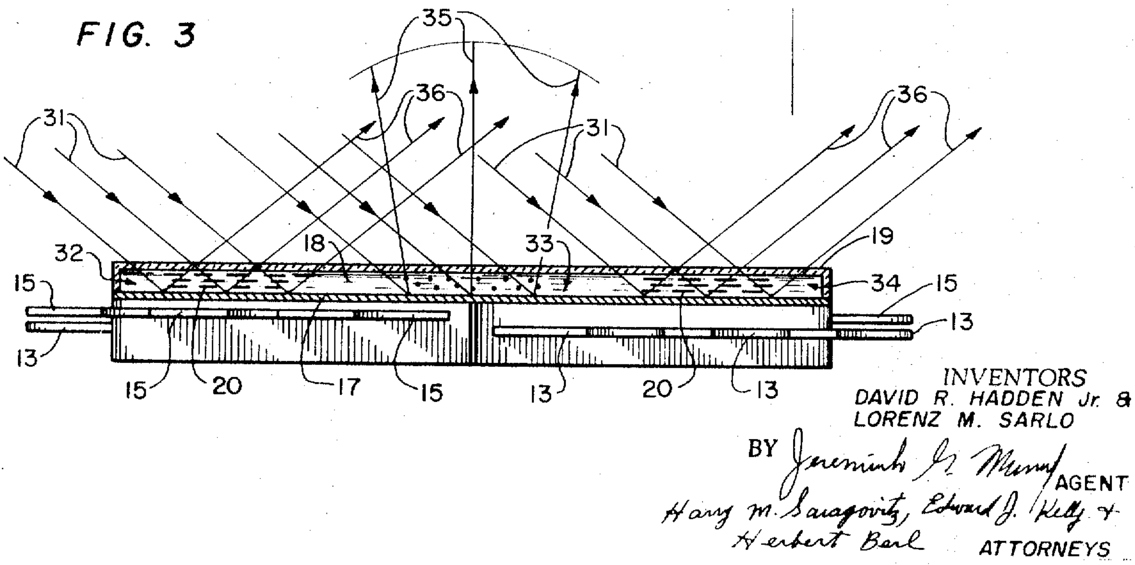
FIG. 3 illustrates an elevation view partly in section of the device shown in FIGS. 1 and 2.

With particular reference to FIGS. 2 and 3, the theory of operation will now be described. Those areas on magnetic film 11 located beneath the intersections of conductors 13 and 15 define the domains in which the elementary dipoles in film 11 are aligned in one of two directions parallel to the easy axis of film 11. For example, if the easy axis is assumed to be parallel to conductors 15 then, as is well known, the elementary dipoles can be selectively oriented in either of two directions along the easy axis. The orientation of the dipoles in a domain may, therefore, represent binary data with one orientation designated "1" and the opposite orientation designated a "0." In order to switch the dipoles in a domain from one state of orientation to the opposite state, a coincident of currents of proper strength and direction are generated on those conductors 13 and 15 which intersect above the domain in question. Therefore, an entire array of binary data may be stored in film 11 by properly pulsing the conductors 13 and 15, there by forming an array of domains the state of which will indicate the stored information. This information may be stored for an indefinite length of time and can be changed only by providing the proper currents on the proper films 13 and 15.

The information on film 11 may be read out electronically by pulsing the associated conductor 15, which will rotate the dipoles in film 11 away from the easy axis. The direction of rotation of the dipoles will be either clockwise or counterclockwise depending on the orientation of the dipoles. As the dipoles are rotated, currents will be generated on the conductors 13, the polarities of which will be determined by the information stored i.e. the the direction of rotation of the dipoles.

The rotatable anisotrophy film 17 will also form domains in those regions directly above the domains formed in the film 11. The rotatable anisotropy film 17 will merely follow the dipoles in the film 11 and acts as a keeper or lower coercivity mating film. However, as explained in detail in the "Applied Physics Letters" article cited above, the domain structure of film 17 is dense-banded with variations in the direction of magnetization in a direction perpendicular to the plane of the film 17. In other words, the average magnetization over a particular domain in film 17 will be in the plane of the film 17 and in a direction which is opposite to the direction of the associated domain in film 11. Therefore, on the average the film 17 acts as a keeper film for film 11. However, the microdomain structure of the magnetization also has a component in a direction which is perpendicular to the film and varies rapidly over the domain in a periodic fashion. The ferromagnetic particles 20 will produce a pattern by lining up in the general direction of the average magnetization over the domain and by collecting at those points in the domains where the magnetization component perpendicular to the film 17 is the strongest.

Displaying of the information optically is accomplished by applying a bias field in the hard direction of film 11 such that the magnetic dipoles of the domains oriented in one direction are rotated clockwise through an angle of about 45° while the dipoles oriented in the opposite direction are rotated counterclockwise through an angle of about 45°. For example, assume that the easy axis is oriented parallel to conductors 15 and that the currents are generated on two of the conductors 15 in the direction of the arrows 21. The binary information stored in the film 11 and, therefore, induced in film 17 will determine the direction of the magnetization of the domains 22—30. For example, assume the binary "1" is represented by a domain directed to the rear as viewed in FIG. 2, and that a binary "0" is then represented by a domain directed to the front. Therefore, domains 22 and 23 would each contain a binary "1" and domain 24 would contain a binary "0." From an optical standpoint, however, the bitter pattern produced by the domains containing a binary "1" would be the same as those produced by a domain having a binary "0." However, by generating currents on conductors 15, a bias magnetic field is produced which will rotate the magnetization of the domains containing a binary "1" in a direction opposite to those containing a binary "0." The ferromagnetic particles 20 in the suspension 18 will follow along and produce striations which are oriented at 90° to each other. For example, domains 25, 27, 29 and 30 are each contained a binary "1" and the magnetization vector, which was originally directed to the rear in FIG. 2, is shown rotated counterclockwise due to the bias field produced by the currents 21. An opposite rotation takes place in domains 26 and 28, each of which contain a binary "0." For purposes of illustration, the particles 20 and the magnetization vector in domains 22, 23, and 24 are not rotated but are shown in their normal position.

With the particles 20 rotated out of the easy axis and into the positions shown in domains 25—30 of FIG. 2, an optical pattern of bright and dark spots can be formed as shown in FIG. 3. FIG. 3 shows the magnetic film 17, the coloidal suspension 18, having particles 20 therein, and the transparent envelope 19. There are three regions 32, 33, and 34 in the suspension 18 which are assumed to be defined by three domains in the film 17. When the particles 20 in the suspension have been rotated in opposite directions as explained above, light may be directed perpendicular to the group of particles 20 which are oriented in one direction and at an acute angle to the surface of film 17 as shown by arrows 31. Those particles 20 which are generally parallel to the light rays 31 will not appreciably effect the light which will simply be reflected off the film 17 in the direction of arrows 36. However, those particles 20 which are perpendicular to the light rays 31 will cause diffraction of the light thereby producing a diffraction pattern as illustrated by arrows 35. A pattern of bright spots (rays 35) and dark spots (rays 36) can therefore be observed when the device is viewed from above as seen in FIG. 3. Of course, as in the case of the CRT the pattern of bright and dark spots can be used to form visual patterns.

What we claim is:

1. A combination digital display and memory element comprising; a film of uniaxial anisotropic magnetic material means for forming a plurality of domains having an easy axis which lies in the plane thereof; means for selectively switching the direction of magnetization along said easy axis in said domains; a film of rotatable anisotropic magnetic material means mounted over said first mentioned film for forming a plurality of densely-banded domains the average magnetization of which is directed parallel and opposite to the magnetization in said first mentioned domains adjacent thereto; a plurality of ferromagnetic particles covering said rotatable anisotropic magnetic material; and hard axis bias means for rotating the magnetization of said oppositely polarized domains in opposite directions through an acute angle and in the plane of sad material.

2. The device according to claim 1 and wherein said acute angle is substantially 45°.

3. The device according to claim 1 and wherein said means for switching includes a matrix of crossed conductors mounted between said films of magnetic material.

4. The device according to claim 1 and wherein said ferromagnetic particles are in a coloidal suspension.

5. The device according to claim 4 and further including a transparent cover mounted over said coloidal suspension.

6. A combination digital display and memory element comprising; a substrate; a first thin film of magnetic material deposited on said substrate; said first thin film of magnetic material having a uniaxial anisotropy such that the easy axis thereof lies in the plane of said film; a first set of parallel thin film conductors mounted over said first thin film of magnetic material; a second set of parallel thin film conductors mounted transverse to said first set of conductors; a second thin film of magnetic material mounted on said second set of conductors; said second thin film of magnetic material having a rotatable anisotropy and a dense-banded domain structure; a coloidal suspension of ferromagnetic particles mounted over said second magnetic film; and a transparent wall mounted over said coloidal suspension.